United States Patent
Yang et al.

(10) Patent No.: US 6,723,573 B2
(45) Date of Patent: Apr. 20, 2004

(54) PHOTONIC DEVICES AND PICS INCLUDING SACRIFICIAL TESTING STRUCTURES AND METHOD OF MAKING THE SAME

(75) Inventors: Liyou Yang, Plainsboro, NJ (US); Haiyan An, Plainsboro, NJ (US)

(73) Assignee: Sarnoff Corporation, Princeton, NJ (US)

( * ) Notice: Subject to any disclaimer, the term of this patent is extended or adjusted under 35 U.S.C. 154(b) by 73 days.

(21) Appl. No.: 10/222,177

(22) Filed: Aug. 16, 2002

(65) Prior Publication Data

US 2004/0033633 A1 Feb. 19, 2004

(51) Int. Cl.[7] .......................... H01L 21/66; G01R 31/26
(52) U.S. Cl. .................................................... 438/16
(58) Field of Search .................. 438/16, 14, 22–23, 438/28

(56) References Cited

PUBLICATIONS

Masanovi et al. (Final Report 1998–1999 for MICRO Project 98–035, RDL and Lucent Technologies). 1998–99 Report. <http://www.ucop.edu/research/micro/98_99/98_035.pdf> visitied May 14, 2002.*

Detofsky et al., "Equivalency Processing Parallel Photonic Integrated Circuit" Applied Optics, V 39., No. 5, Feb. 10, 2000.*

Yang et al. (US 2002/0176467 A1 "Photonic Integrated Circuit and Method for Making the Same" Nov. 28, 2002 (filed Apr. 26, 2002).*

* cited by examiner

Primary Examiner—Craig A. Thompson
(74) Attorney, Agent, or Firm—William J. Burke

(57) ABSTRACT

A testing structure formed on a photonic integrated circuit including a plurality of first photonic components and having a given functionality corresponding to a given interconnectivity of the first photonic components, the testing structure including: at least one second photonic component being suitable for testing at least one of the first photonic components; and, at least one photonic pathway optically coupling the at least one first photonic component to the at least one second photonic component. The at least one photonic pathway is unique from the given interconnectivity.

15 Claims, 7 Drawing Sheets

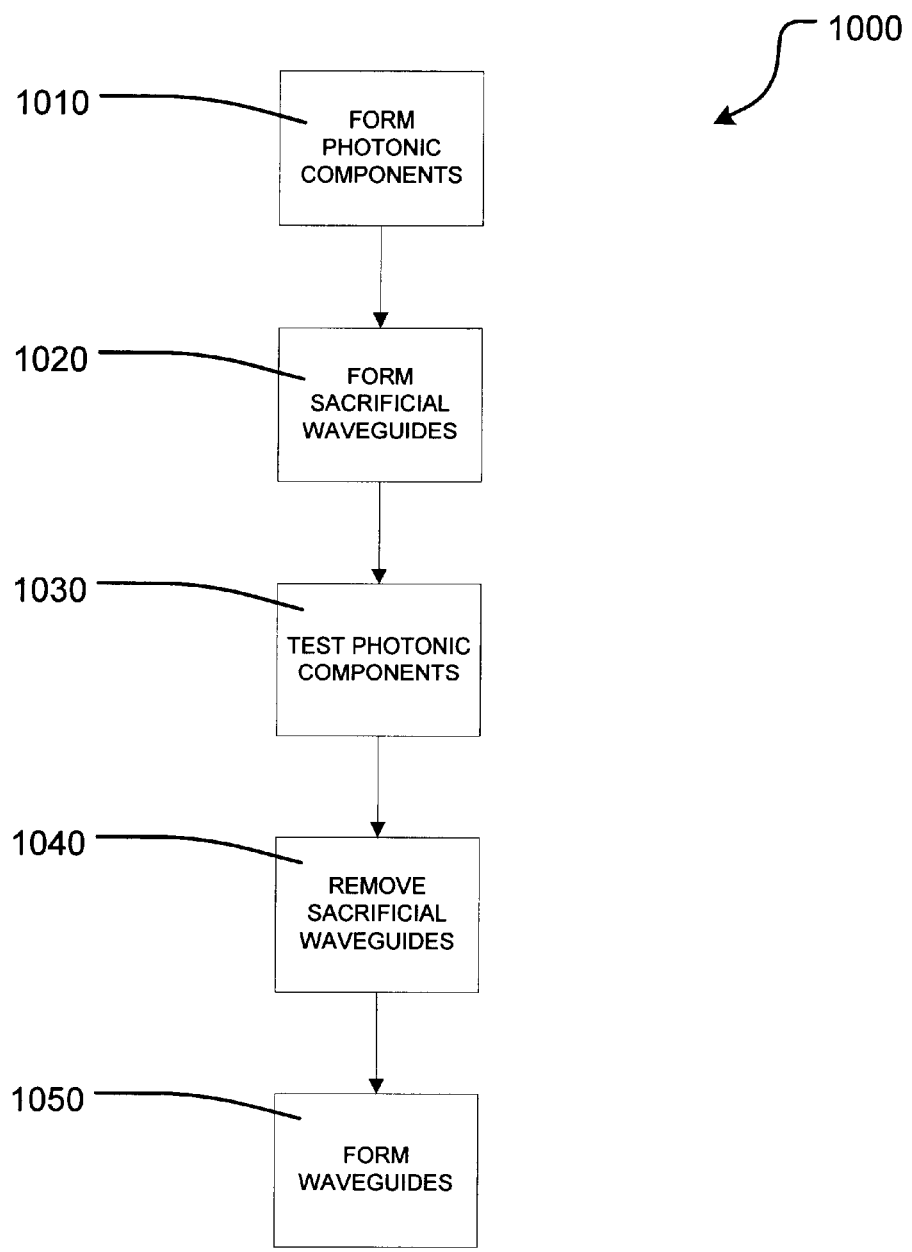

PHOTONIC DEVICES AND PICS INCLUDING SACRIFICIAL TESTING STRUCTURES AND METHOD OF MAKING THE SAME

FIELD OF THE INVENTION

The present invention relates generally to photonic devices and methods for the same.

BACKGROUND OF THE INVENTION

The use of photonic components such as type III-V semiconductor compound photonic components in photonic devices and Photonic Integrated Circuits (PICs) is desirable. Such circuits may be monolithic in nature. Monolithic integration of photonic components on a single chip may present advantages over discrete devices in fiber optic communications and other applications.

Many processes are conventionally used in manufacturing such components, devices and PICs, such as epitaxial growth, etching and photolithography for example. Due to a number of well known factors, such processes typically lead to less than optimum production yields. That is, a certain percentage of components are expected not to operate as intended. As devices and PICs become more complex and include a greater number of photonic components, the percentage of defective devices and PICs likewise increases. This is believed to have the undesirable effect of driving up costs associated with photonic devices and PICs. In other words, when a multitude of photonic components are integrated into a single device or PIC, the compound yield of the device or PIC will be the product of that of photonic components used for the device or PIC. As the yield of individual components decreases, the compound yield of the device or PIC is believed to quickly decrease with the total number of components incorporated.

SUMMARY OF INVENTION

A testing structure formed on a photonic integrated circuit including a plurality of first photonic components and having a desired functionality corresponding to a given interconnectivity of the first photonic components, the testing structure including: at least one second photonic component being suitable for testing at least one of the first photonic components; and, at least one photonic pathway optically coupling the at least one first photonic component to the at least one second photonic component; wherein, the at least one photonic pathway is unique from the given interconnectivity.

BRIEF DESCRIPTION OF THE FIGURES

Understanding of the present invention will be facilitated by consideration of the following detailed description of the preferred embodiments of the present invention taken in conjunction with the accompanying drawings, wherein like numerals refer to like parts and in which:

FIG. 7 illustrates a flow diagram according to an aspect of the present invention.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in typical photonic components, devices, Photonic Integrated Circuits (PICs), optical waveguides and manufacture methods relating thereto. Those of ordinary skill in the art will recognize that other elements are desirable and/or required in order to implement the present invention. However, because such elements are well known in the art, and because they do not facilitate a better understanding of the present invention, a discussion of such elements is not provided herein. The disclosure herein is directed to all such variations and modifications to such components, devices, PICs, waveguides and methods known to those skilled in the art.

According to an aspect of the present invention, active components, such as lasers, receivers, amplifiers and optoelectronic switches for example, may be interconnected in planar PICs using passive waveguides. The interconnecting waveguides may be used to define which photonic components, or sets of components, are ultimately used in the PIC.

According to an aspect of the present invention, redundant photonic components, from the standpoint of the finalized PIC, may be provided as part of the PIC. By creating and then using removable waveguides, defective components may be identified, and interconnect circuitry modified or designed so as to avoid use of the identified defective components.

According to an aspect of the present invention, such on-chip testing can be accomplished by making the waveguides in the form of a sacrificial testing optical circuit that can be constructed and then removed without deteriorating photonic component performance.

According to an aspect of the present invention, amorphous silicon (a-Si) materials, including for example a-Si:H and a-Si:F based alloys such as a-SiC$_x$ where $0<x<1$, a-SiN$_y$ where $0<y<1.33$, a-SiO$_z$ where $0<z<2$ and a-SiGe$_w$ where $0<w<1$ may be utilized to form waveguides for integrating the sacrificial testing structure with the active photonic components. According to an aspect of the present invention, polymer based waveguiding structures may be analogously utilized.

According to an aspect of the present invention, a-Si based alloy material, such as a-Si:H or a-Si:F based alloy waveguides may be fabricated using Plasma Enhanced Chemical Vapor Deposition (PECVD), resulting in a low intrinsic optical absorption coefficient (approximately 0.1 cm$^{-1}$ at 1.55 $\mu$m), allowing the development of low-loss waveguide structures.

Figure 1:
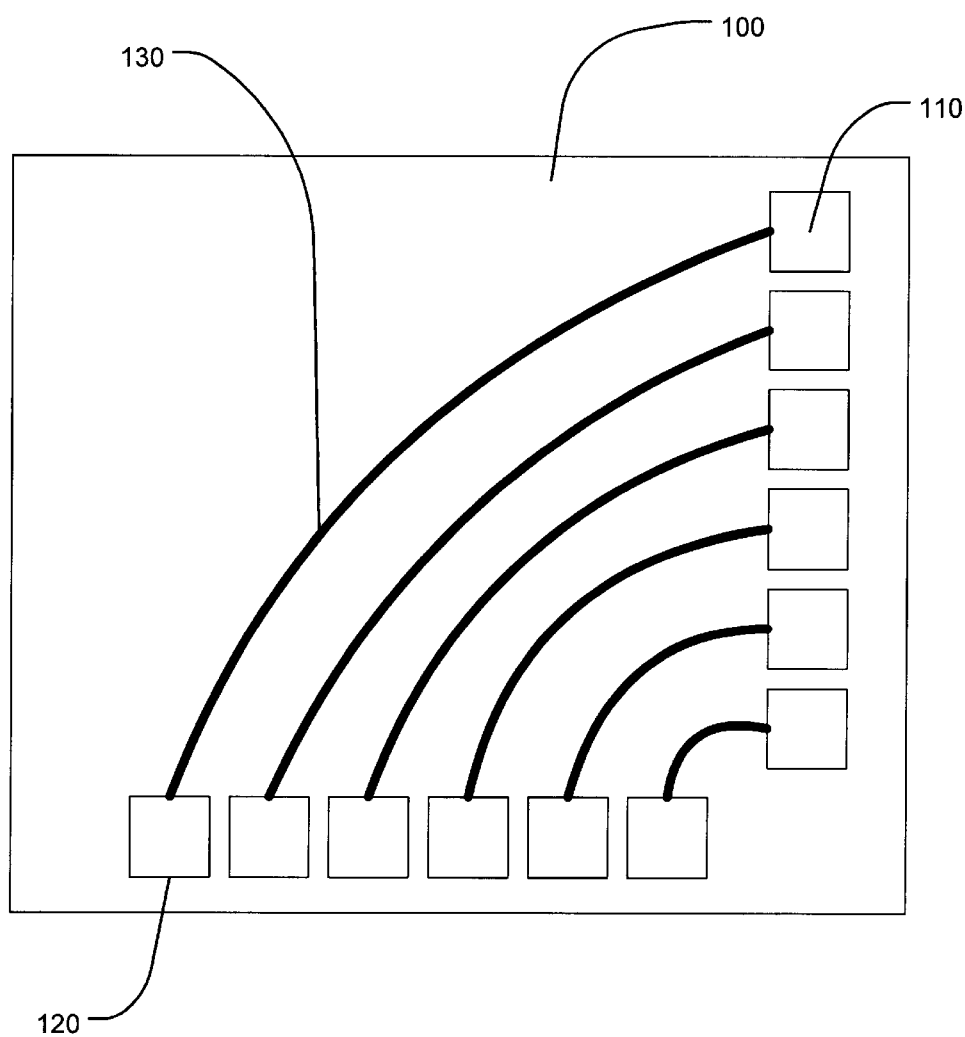
FIGS. 1–6 illustrate PICs according to aspects of the present invention.

Referring now to FIG. 1, there is shown a schematic representation of a PIC 100 at a first processing stage according to an aspect of the present invention. PIC 100 includes a sacrificial testing structure for an integrated laser array device for sake of non-limiting explanation only. In addition to the intended laser array 110 which has been formed with redundancy, an array of receivers 120 are also fabricated on the same chip. These detectors 120 may or may not be part of the intended eventual device design and PIC 100 intended functionality.

The array of type III-V semiconductor compound based laser components 110 includes a number of individual devices 110 greater than the required number for PIC 100 intended operability. That is, if X components are needed to accomplish the desired functionality of PIC 100, Y components may be fabricated on the PIC 100, where X<Y. The difference between X and Y may be dependent upon a number of factors, including for example anticipated production yields for each of the components 110 and/or 120, and the desired production yield of PICs 100. Further, if a PIC having a different desired functionality which requires Z number of components 110, and Z<Y, a desired production of such PICs may also be considered, based upon the anticipated production yield of the components 110, 120, for example.

PIC 100 includes a number of testing components suitable for testing devices 110, in the case of PIC 100, an array of receivers, or photonic detectors, 120. Components 120 may or may not be useful for the intended operation of PIC 100, or optionally may be used to provide enhanced functionality therefore, for example.

Components 110, 120 are communicatively coupled to one another using an array of waveguides 130. For example, each of the components 110 may be optically coupled to a corresponding component 120 using a corresponding photonic waveguide 130. Alternatively, more than one component 110 may be coupled to a single component 120, provided each of the components 110 are selectively operable for example. Likewise, a number of components 120 may be coupled to a single component 110 to provide for redundancy in testing, for example.

PIC 100 may be tested by activating components 110, either sequentially or in parallel for example, and checking their operation using components 120, as is conventionally understood. If an output is not received at a particular receiver 120 for example, it may be assumed that either: 1) component 120 is defective in some manner, 2) the corresponding component 110 is defective in some manner and/or 3) the corresponding waveguide 130 is defective in some manner. Regardless, use of either the particular component 110 and/or 120 may be avoided in continued processing of PIC 100. Significantly however, those components whose operability has been confirmed through such on-chip testing can be used in further processing of PIC 100.

Figure 2:
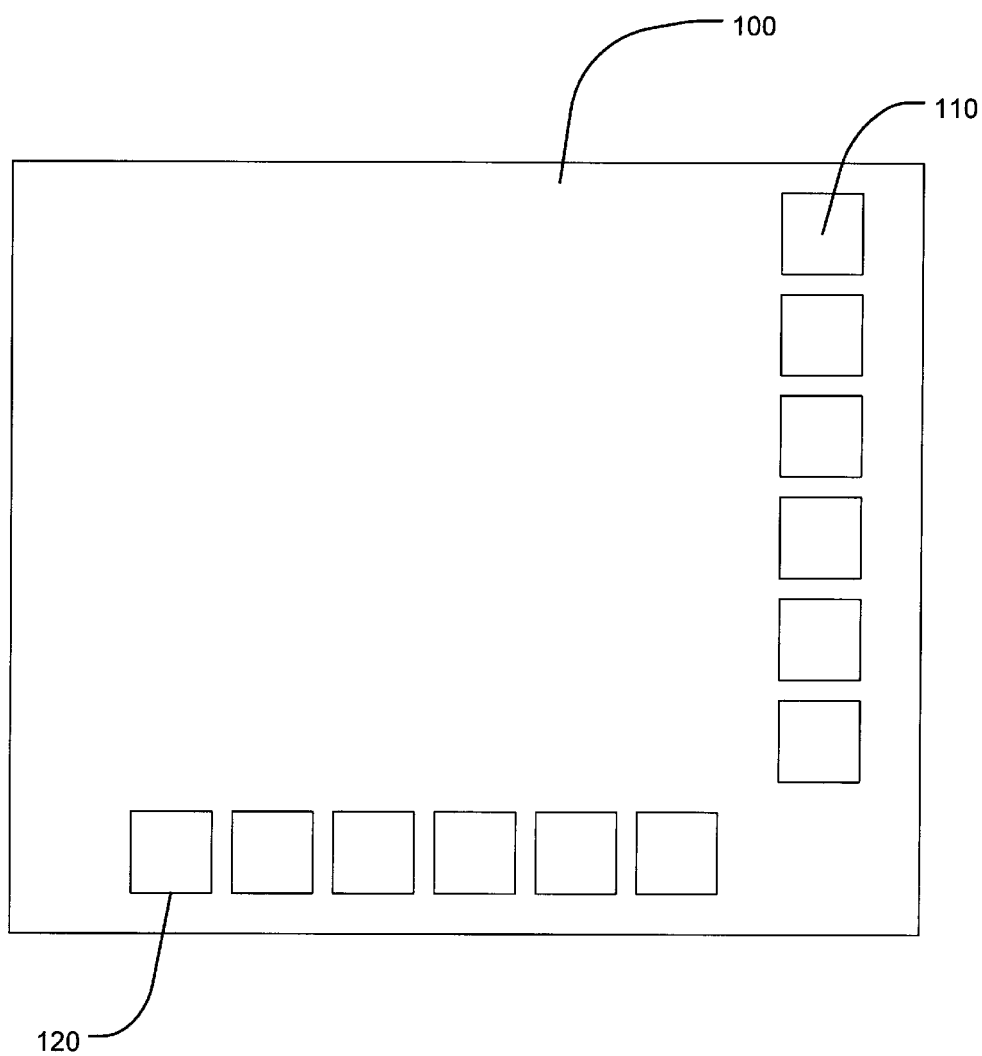

Referring now also to FIG. 2, there is shown a schematic representation of PIC 100 at a second processing stage according to an aspect of the present invention. Sacrificial waveguides 130 have been removed, leaving arrays of components 110, 120.

Figure 3:
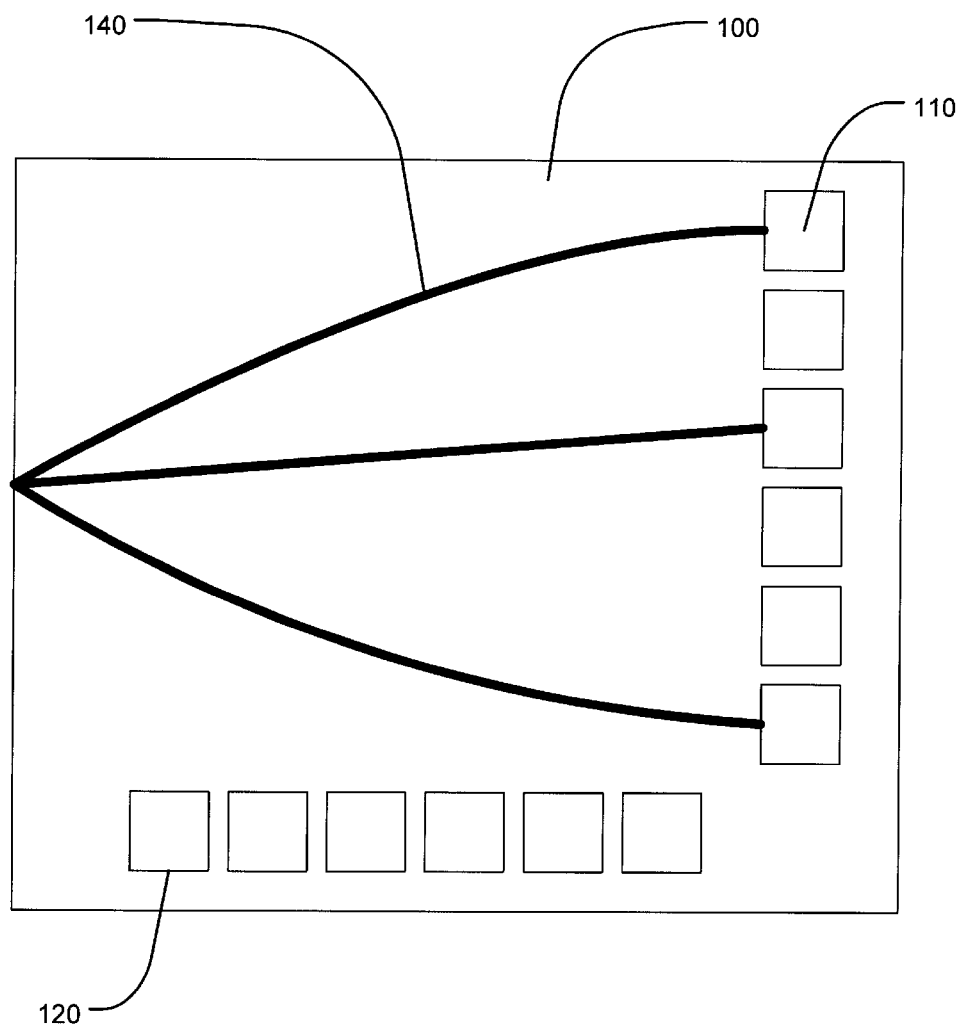

Referring now also to FIG. 3, there is shown a schematic representation of PIC 100 at a third processing stage according to an aspect of the present invention. Waveguides 140 are fabricated so as to provide the desired functionality of PIC 100 using components 110 whose operability has been confirmed by testing using components 120 and waveguides 130.

Figure 4:
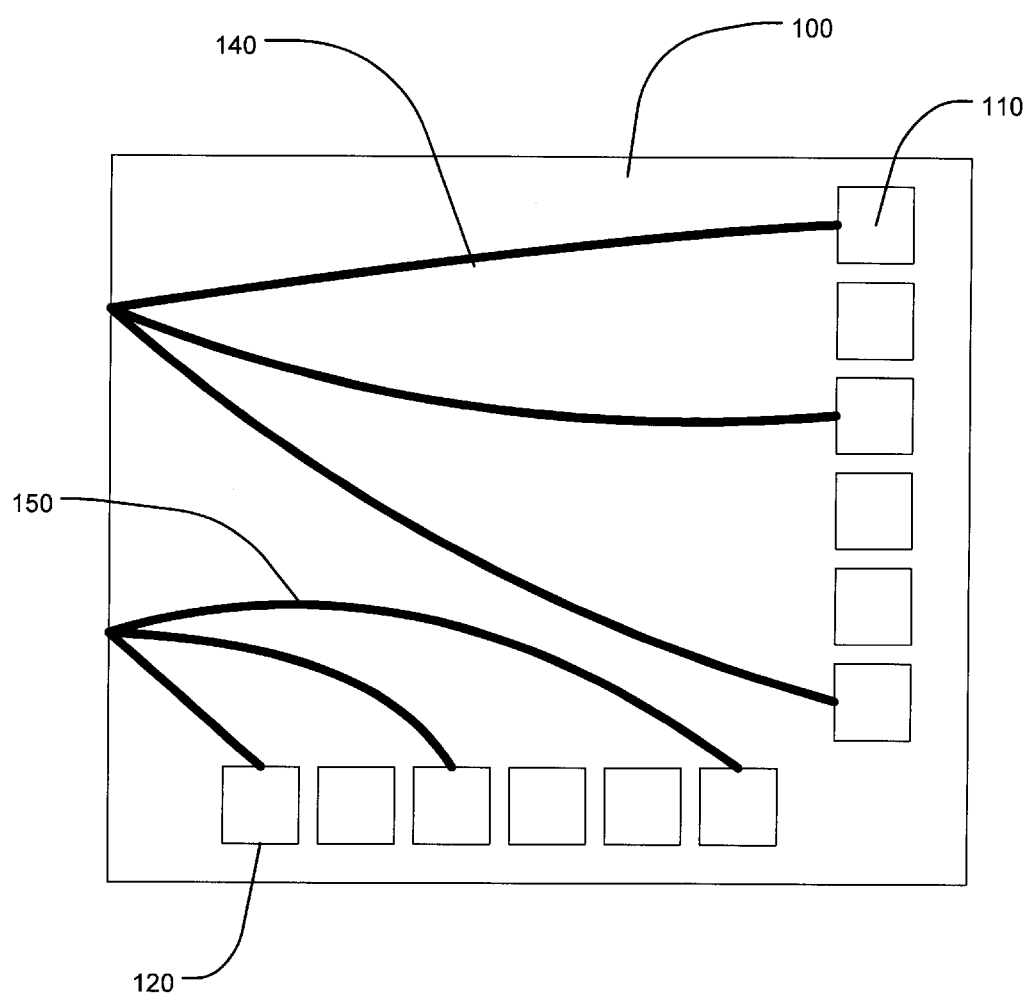

Referring now also to FIG. 4, as has been set forth components 120 may be used to provide enhanced functionality for PIC 100. Waveguides 150 may be fabricated so as to provide communicability with components 120 and the enhanced functionality associated therewith.

Figure 5:
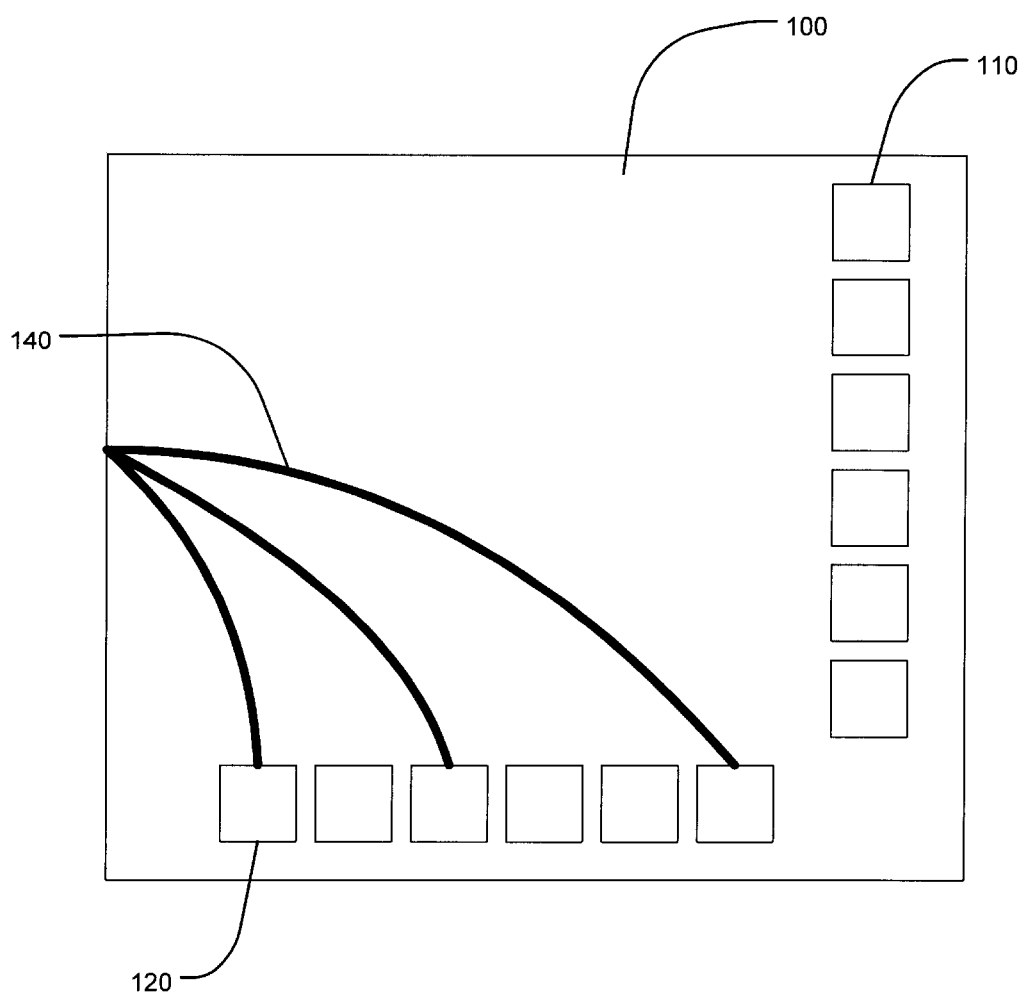

Referring now also to FIG. 5, in the case where a greater number of components have failed to be confirmed as operable by on-chip testing, different functionality for the PIC 100 may be achieved using waveguides 140. In the non-limiting and illustrative case of FIG. 5, using components 120 for example. Of course, any combination of components 110 and/or 120 whose operability has been confirmed through testing may be used to provide this alternative functionality.

Figure 6:
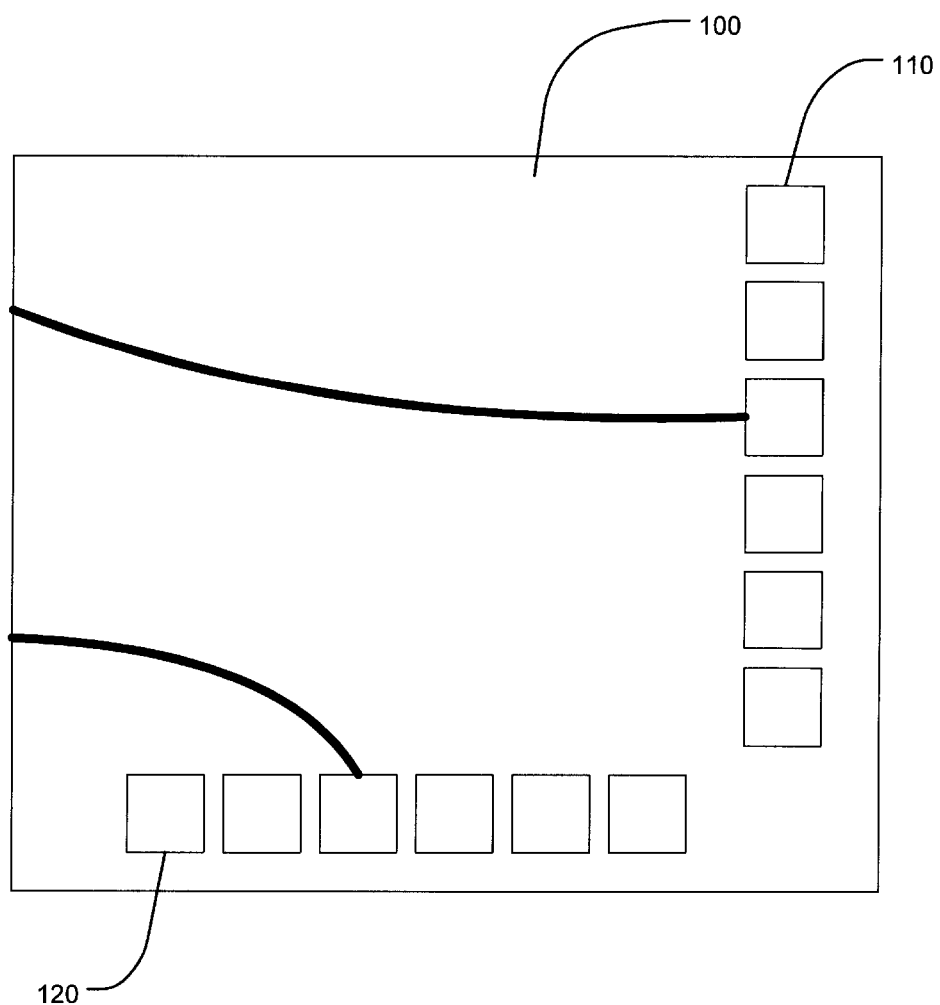

For example, and referring now also to FIG. 6, PIC 100 could use devices 110 and/or 120 whose operability has been confirmed for purposes of achieving enhanced alternative functionality in such a case.

Referring again to FIG. 1, and now also to FIGS. 3–6, according to an aspect of the present invention, amorphous silicon (a-Si) materials may be used to provide flexible, index matched, low loss waveguide coupling to active and passive device components in a monolithically integrated optoelectronic product, such as PIC 100. According to an aspect of the present invention, amorphous silicon (a-Si) materials, including a-Si:H and a-Si:F based alloys such as a-SiC$_x$ where 0<x<1, a-SiN$_y$ where 0<y<1.33, a-SiO$_z$ where 0<z<2 and a-SiGe$_w$ where 0<w<1 may be utilized to form waveguides for integrating active and passive components in optoelectronic products, such as PIC 100.

Moreover, etching selectivity between such a-Si materials and type III-V semiconductor materials is good, helping make it particularly suitable for use as a sacrificial on-chip testing technology. For example, a-Si based alloy material waveguides can be fabricated at approximately 250° C. and be readily removed after testing. Because of their amorphous nature, a-Si based alloy materials do not have the lattice match requirements of crystalline materials. Furthermore, the ability to tune the optical index substantially continuously, from 1.5 to 4 for example, provides for improved index matching and low loss waveguide coupling to active components as compared to conventional techniques.

In the case of such a-Si based alloy materials, optical absorption at an operating wavelength of 1.55 $\mu$m is desirably low, leading to low loss and good optical transmission properties as will be understood by those possessing an ordinary skill in the pertinent arts. For example, the absorption coefficient corresponding to a-Si:H may be approximately 0.1 cm$^{-1}$, advantageously providing for waveguide losses on the order of approximately 0.5 dB/cm at 1.55 $\mu$m, for example.

Further, by mixing the main gas that undergoes plasma assisted decomposition in the a-Si based alloy material PECVD process, such as SiH$_4$, with other chemicals, such as CH$_4$, CO$_2$, N$_2$, NH$_3$ or N$_2$O, wider energy gaps may be achieved with lower refractive indices.

Referring now also to FIG. 7, there is shown a flow diagrammatic view of a method 1000 for forming a PIC, such as PIC 100 (FIG. 1), according to an aspect of the present invention. Method 1000 generally includes forming photonic components 1010, forming a testing interconnection structure 1020 including sacrificial waveguides, testing the photonic components 1030, removing the testing interconnecting structure 1040 and forming waveguides 1050.

Photonic components, such as the components 110, 120 (FIG. 1), may be formed 1010 using any suitable methodology and materials. Such methodologies and materials are well known to those possessing an ordinary skill in the pertinent arts. Such methodologies may include conventional type III-V semiconductor compound photonic device manufacture methods such as epitaxial growth, etching and photolithography to name a few. Utilized materials may include type III-V semiconductor compound materials as will be readily understood by those possessing an ordinary skill in the pertinent arts. Some examples of materials which may be suitable for use depending upon the nature of the intended device 110, 120 include for example: GaAs, AlGaAs, InGaAs, GaAsSb, InGaAsP, GaN, to name a few. The photonic components may be formed 1010 on any suitable substrate, such as silicon (c-Si), InP or GaAs, for example.

According to an aspect of the present invention, redundant components may be formed. That is, if X components are needed to achieve a desired functionality of the final PIC, Y components may be formed 1010, where X<Y.

The testing structure may be formed 1020 according to an aspect of the present invention, using Plasma Enhanced Chemical Vapor Deposition (PECVD) of a-Si based alloy materials, such as a-Si:H or a-Si:F based alloys. Resulting waveguides may exhibit a low intrinsic optical absorption coefficient (approximately 0.1 cm$^{-1}$ at 1.55 $\mu$m) and low-loss characteristics. The electronic and optical characteristics of a-Si based alloy materials may be altered depending on the waveguide formation method, such as sputtering or PECVD. For example, sputtered a-Si has been generally characterized as having a high density of states in the forbidden band and optical absorption coefficients greater than 10 cm$^{-1}$ at 1.55 $\mu$m. However, PECVD a-Si based alloy materials may exhibit lower absorption coefficients in the infrared wavelengths, such as in the range of 1.3 and 1.55 $\mu$m.

Waveguides 130 may take the form of an a-Si alloy material layer having a refractive index of approximately 3.4 deposited upon an a-Si alloy material undercladding layer having a refractive index of approximately 3.2 in turn deposited on a c-Si wafer. The a-Si alloy undercladding layer may be approximately 1 $\mu$m thick, while the a-Si:H alloy core may be approximately 0.5 $\mu$m thick. An a-Si alloy material layer having a refractive index of approximately 3.2 may be provided as an overcladding layer, and have a thickness of approximately 1 $\mu$m for example. The a-Si alloy under- and overcladding may be formed using RF or DC plasma assisted decomposition of SiH$_4$ or N$_2$ (see FIG. 4), for example. In the case of N$_2$, an N$_2$ to SiH$_4$ flow ratio of approximately 0.9 may be used while the substrate temperature is held at approximately 250° C. To form the a-Si alloy core layer, the N$_2$ to SiH$_4$ flow ratio may be approximately 0.45, while the substrate temperature is held at approximately 250° C. Processing pressure may be approximately 1.5 torr, while the 13.56-MHz RF power is held approximately at 50 W, for example.

The sacrificial waveguides, and cores thereof, may be defined using standard photolithographic patterning of the planar amorphous stack and plasma etching, for example. The sacrificial waveguides may be monolithically formed with the formed devices, for example.

Thereafter, the composite structure may be tested 1030 using conventional techniques. For example, the laser array 110 of FIG. 1 may be activated and tested using detector array 120 of FIG. 1 and conventional methodologies. Such testing identifies which of the formed device pairs are operating properly. For example, upon activation of lasers 110, those detectors 120 that output a signal indicative of detecting an operating laser 110 may be identified as operable laser 110—detector 120 pairs.

Thereafter, the testing structure may be removed 1040. The sacrificial waveguides may be removed using any suitable technique, such as etching for example. The process of removing the waveguides 1030 may occur at a relatively low temperature, such as approximately room temperature for example. Etchants which may be utilized include CF$_4$, SF$_6$ and SiC$_4$, by way of non-limiting example only.

Thereafter, suitable waveguide connections to those of the formed components whose operability has been confirmed via testing may be made 1040 to accomplish the desired functionality of the final PIC. These waveguide connections can take the form of, and be formed, consistently with the formation of the testing interconnection structure 1020, for example.

According to an aspect of the present invention, the desired functionality of the PIC may be determined based upon the testing. For example, if a first desired functionality requires X number of operable components, and a second desired functionality requires Y number of operable components, and Z number of operable components have been formed and confirmed as operable, the following may occur. If X<Z, the first functionality may be achieved using suitable interconnection of the operable components. If Y<Z, the second functionality may be achieved using suitable interconnection of the operable components. If X<Z<Y, the first functionality may be achieved using suitable interconnection of the operable components, even if it was originally desired to achieve the second functionality. If Y<Z<X, the second functionality may be achieved using suitable interconnection of the operable components, even if it was originally desired to achieve the first functionality.

Of course, where multiple functionalities may be achieved, such as where X<Z and Y<Z, conventional methodologies, such as the principles of supply and demand, may be used to determine which functionality is to ultimately be achieved.

It will be apparent to those skilled in the art that various modifications and variations may be made in the apparatus and process of the present invention without departing from the spirit or scope of the invention. Thus, it is intended that the present invention cover the modification and variations of this invention provided they come within the scope of the appended claims and their equivalents.

What is claimed is:

1. A method for making a photonic integrated circuit comprising:

forming a plurality of first photonic components having a given functionality corresponding to a given interconnectivity of said first photonic components;

forming at least one second photonic component optically coupled to and being suitable for testing at least one of said first photonic components;

testing said at least one first photonic component using said second photonic component;

optically decoupling said at least one first and second photonic components; and, forming at least one second photonic pathway to provide said given interconnectivity to select ones of said first photonic components dependently upon said testing.

2. The method of claim 1, wherein said first and second photonic components and first and second photonic pathways are integrated on a single substrate.

3. The method of claim 1, further comprising forming at least one third photonic pathway to provide interconnectivity for said at least one second photonic component.

4. The method of claim 1, wherein said first and second photonic pathways comprise waveguides.

5. The method of claim 4, wherein said waveguides comprise at least one amorphous silicon based alloy material.

6. The method of claim 5, wherein said amorphous silicon based alloy material comprises at least one material selected from the group consisting essentially of: a-Si:H and a-Si:F based alloys.

7. The method of claim 6, wherein said amorphous silicon based alloy material comprises at least one material selected from the group consisting essentially of hydrogenated or flourinated a-SiCx where 0<x<1, a-SiNy where 0<y<1.33, a-SiOz where 0<z<2 and a-SiGew where 0<w.

8. A method for making a photonic device comprising:

forming a first plurality of first photonic components having a given functionality corresponding to a given interconnectivity of said first photonic components;

forming a second plurality of said first photonic components;

forming at least one second photonic component being suitable for testing at least one of said first photonic components;

forming at least one first photonic pathway optically coupling at least one first photonic component to said at least one second photonic component;

testing said at least one first photonic component using said at least one first photonic pathway and second photonic component;

removing said at least one first photonic pathway; and, forming at least one second photonic pathway to provide said given interconnectivity to select ones of said first photonic components dependently upon said testing.

9. The method of claim 8, wherein said first and second photonic components and first and second photonic pathways are integrated on a single substrate.

10. The method of claim 8, further comprising forming at least one third photonic pathway to provide interconnectivity for said at least one second photonic component.

11. The method of claim 8, wherein said first and second photonic pathways comprise at least one amorphous silicon based alloy material.

12. The method of claim 11, wherein said amorphous silicon based alloy material comprises at least one material selected from the group consisting essentially of: a-Si:H and a-Si:F based alloys.

13. The method of claim 12, wherein said amorphous silicon based alloy material comprises at least one material selected from the group consisting essentially of hydrogenated or fluorinated: a-SiCx where $0<x<1$, a-SiNy where $0<y<1.33$, a-SiOz where $0<z<2$ and a-SiGew where $0<w<1$.

14. The method of claim 8, wherein said decoupling is compatible with said first photonic components.

15. The method of claim 8, wherein at least one of said first and second photonic pathways comprise at least one polymer based material.

* * * * *